Feb. 20, 1951
M. O. STEENDAHL
2,542,369
AUTOMOBILE WINDOW CLOTHING HANGER ATTACHMENT
Filed Jan. 19, 1948
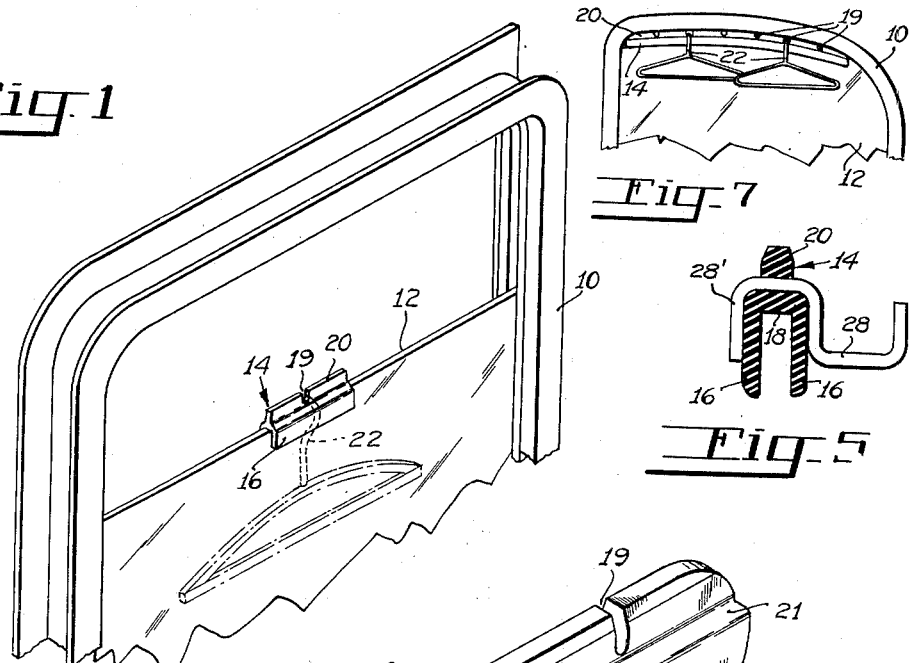
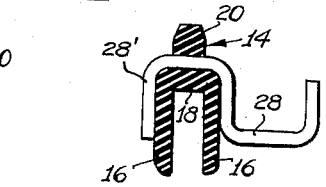
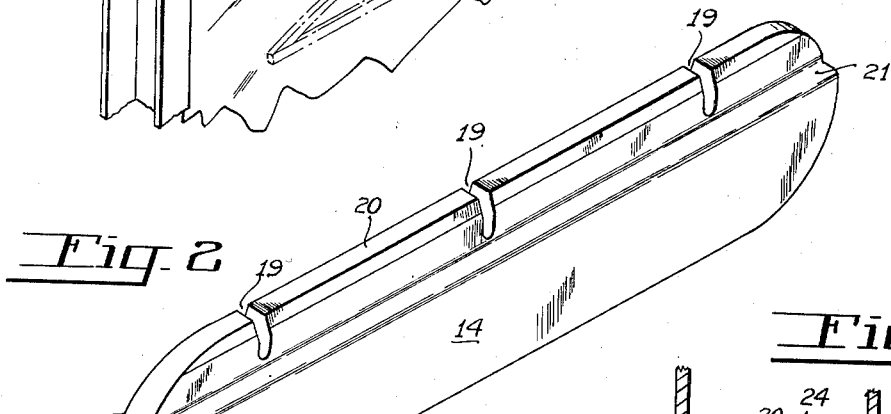
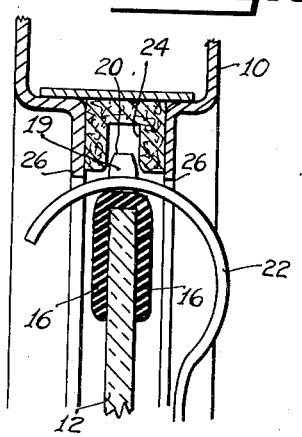
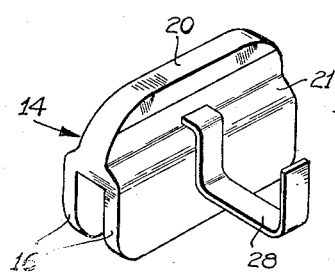
INVENTOR.
MARCUS STEENDAHL
BY
Reynolds + Beach
ATTORNEYS Patented Feb. 20, 1951

2,542,369

UNITED STATES PATENT OFFICE 2,542,369

AUTOMOBILE WINDOW CLOTHING HANGER ATTACHMENT

Marcus O. Steendahl, Seattle, Wash.

Application January 19, 1948, Serial No. 3,127

2 Claims. (Cl. 224—29)

1

This invention relates to automobile window attachments for the support of clothing hangers or hooks, and it has for its principal object to provide a rigid and convenient support along the upper edge of an automobile side window but mounted in such a manner that heavy loads of clothing may be hung from it without danger of damage to the window glass or window casing, or of shaking loose, even under conditions of rough travel.

With this in view, a feature of the invention resides in a novel window attachment which grips the upper edge of the window and has a stiffener or flange member adapted to project upwardly from it into the channel or groove in the window casing normally occupied by the window's upper edge when closed. Not only does such a member lock the attachment in place, but it also acts to stiffen the window pane laterally and prevent its cracking even under a heavy load of clothing supported from it. With such added support to the window, bracing it laterally, there is thus substantially no danger of its giving way under load, because the ordinary window elevating mechanism is itself capable of supporting very substantial downward forces applied to the window, and the window cannot shift horizontally edgewise because of the casing.

By way of further objects, it will be appreciated that it is also desirable to restrain the clothing support from shifting back and forth along the window's edge, and to distribute the load force acting on the window so that the glass will not chip or crack under strain.

My improved attachment is preferably of rubber or plastic material which is of substantial rigidity and yet sufficiently resilient to absorb shock loads. Alternatively, I may in some instances construct it of metal with soft rubber or felt padding interposed between the metal portions and the window.

According to further features of my invention, the improved window attachments described herein are easily installed, removed, and stored away in the car, can be used with windows of varying shapes, and when installed permit substantially full closure of the window upon which it is mounted.

Other features and advantages of my invention will become further evident from the description which follows, based upon the accompanying drawings.

Figure 1 is a perspective view of one form of my invention installed on an automobile window with the window then ready to be raised virtually to closed position.

Figure 2 is a perspective view of a similar window attachment but which is adapted for carrying a greater number of clothes hangers; Figure 3 is a sectional view of a portion of a window

2 and window casing, with the window attachment installed, the window being raised sufficiently to show the attachment engaging the casing, but not raised fully to the position which it would occupy in securing the window attachment and garment hanger in place.

Figures 4 and 5 are perspective and transverse sectional views, respectively, of a modified form of window attachment embodying an integral supporting hook which can be used for supporting clothes directly or for carrying a plurality of clothes hangers, as may be desired.

Figure 6 is a further modified form of my window attachment, shown in transverse section.

Figure 7 is a side elevation view of further modification of my attachment.

Customarily automobile windows close upwardly because the only space available to receive the window pane when opened is in the door or body panel below. Because modern cars are completely upholstered and their passenger compartments are arched overhead with no convenient locations on the frame of the compartment for mounting clothing hanger attachments or the like, such hangers are frequently hung directly oper the upper edge of the car windows, raised into nearly closed position to elevate the supported articles of clothing as far above the automobile compartment floor or seat as possible, depending on the location of the window, so that they will not drag or wrinkle. When thus mounted, the hangers rattle about and slide down along the curve of the window's edge and with any substantial load tend to chip and crack the glass, so that such a makeshift arrangement is not very satisfactory.

My improved window attachment fits conveniently over the window's upper edge where it can be elevated to the top of the window casing, and because of its form complemental to the casing, the window can be substantially closed. When this is done the attachment's flange or rib becomes wedged between the weather stripping channel of the casing normally embracing the window's edge, and results in locking the attachment in place, as well as providing a secure but resilient lateral support for the window at the location of the attachment. Such an attachment may be installed or removed in the simplest manner, and when not in use can be stored conveniently in the glove compartment or other suitable space in the car.

In Figure 1, illustrating a portion of the window frame 10, such as that comprising the upper section of an automobile door or rear window frame, and having a downwardly opening window 12, the hanger attachment 14 is installed by fitting it downwardly over the window's upper edge. The attachment has generally parallel flanges which form a window-receiving channel to embrace the opposite side faces of the window on which it is mounted. The flanges 16 are joined at their upper edges by a transverse web 18 formed as a single section integral with such flanges, and having a tongue or stiffener rib 20 projecting upwardly generally from the central portion of the web and extending preferably along the entire length of the flanges and web. This rib is of a width at its base at least substantially equal to the width of the groove in the window frame channel, and preferably is upwardly tapered, or has chamfered upper edges so that it may be inserted easily and wedged slightly into the upper channel groove of the window casing normally occupied by the upper edge of the window in closed position.

The rib 20 has notches 19 in its edge extending inwardly substantially to its root at the web 18, to receive the out-turned hook, hung over the web, of a clothing hanger, as shown in broken lines in Figure 1 at 22 where the window has not been closed, and in solid lines in Figure 3 where the window is nearly closed. The weight of the load carried by the clothing hanger is thus brought to bear downwardly against the web of the attachment which distributes it along the edge of the window pane beneath the web. If the automobile should lurch to one side the rib 20 received in the casing braces the attachment directly from the window frame and prevents excessive sideward strain in the glass from the weight, while any small force sidewardly which is borne by the glass is distributed over a substantial area by the flanges 16.

While the attachment may be made of various materials or combinations of materials, and in various forms, I prefer that it be constructed of rubber and molded to the shape shown. In Figure 1 the attachment has only a single notch for supporting one clothing hanger, whereas in Figure 2 a multiple-hanger type attachment is shown as having several notches, but otherwise is of similar proportions, except that it is of greater length.

While it is contemplated that the attachments will be manufactured ready to install directly on a window, it will be evident that the attachment might even be manufactured in long extruded or molded rubber strips notched during or after molding, and which could then be sold in standard lengths to be cut later to the desired length for a particular installation. In such case, as shown in Figure 7, the strip may be cut to extend across the full width of the window, so that, when raised fully, it will fill almost completely the space between the upper edge of the window and the adjacent side of the window frame. Instead of rubber, the attachment could be molded in this case of any suitable rubber-like or plastic material, longitudinal bending to conform to window curvature being desirable where the strip is made comparatively long.

For appearance and ease of molding the lower corners of the flanges 16 may be rounded on a small radius, if desired, and the ends of the rib 20 may also be rounded in order to facilitate engagement of the rib with the channel of a window casing which is curved in the upper corners, where the attachment is slid lengthwise of the pane into such a corner. The base of the rib, which is located a substantial distance above the web's inner, window-engaging face, joins the upper edges of the flanges by somewhat sloping sides 21 overlying the web, and giving it greater body beneath the rib. Other cross-sectional forms for achieving pleasing appearance, rigidity and strength could be used as well.

When the attachment is greatly elongated, as it is in Figure 2, and provided with a plurality of spaced notches 19 or slots formed in its rib to receive out-turned hanger hooks, not only is the combined weight of the hangers distributed over a greater portion of the window's edge to ease the strain in the glass, but the hangers themselves and the clothing they carry take up less otherwise useful space in the car because their combined thickness is less as a result of the successive overlap of hangers instead of a direct piling up of one hanger upon another, as could be true if the attachment shown in Figure 4 is employed where a number of hangers are supported by a single supporting hook 28. On the other hand, the single-hook construction results in a smaller window area being covered, and does not require the hanger's hook to project outside the automobile compartment, so that it may be preferred for these reasons.

In Figure 3 it will be evident that the window carrying the attachment can be raised to substantially closed position to enclose the automobile compartment, and that when this is done the rib 20 of the attachment projects upwardly into the groove of the window weather stripping channel 24, normally receiving the window's edge when closed. I prefer that the rib be tapered as shown, so that it may wedge securely, but readily releasably, into such space. Being thus held between the window and the casing the attachment is not apt to come loose easily and is secured against sliding along the window's edge or tilting out of position in any manner.

So that the attachment will grip the window's edge even when the window is open, the attachment's resilient web 18 may be sufficiently narrower than the thickness of the window, so that the flanges 16 must be spread slightly as they are slid over the glass, and, because of the resilience of the web and flanges, the latter then press tightly against the faces of the window in clamping engagement. If desired, the attachment's flanges may converge slightly toward their free edges to clamp even more tightly over the window. These and other minor variations in construction of the attachment will be evident, and need no further illustration.

In Figures 4 and 5 a modified attachment is illustrated, in which clothing hangers may be carried by a hook 28 projecting laterally from the attachment, its shank being a reversely curved extension 28' which passes through an aperture in the rubber strip portion of the attachment at the base of the rib 20. A portion of such shank rests against the web, and its adjacent portions extend downwardly alongside the flanges 16, the free end of the shank engaging the flange opposite that against which the shank portion supporting hook 28 abuts. The base of the hook is sufficiently long, projecting outwardly from the adjoining side of the attachment, that a number of hanger hooks may be received in it. Alternatively clothing may be hung directly on the hook 28 if desired. The reversely curved shank 28' of the hook 28 may be embedded in the rubber attachment during molding, or it may be inserted later.

Note that the hook may be formed of flat spring metal strip material so that the sides of its U-shaped shank 28' may act together as a clamp pressing the flanges 16 of the attachment inwardly against the pane. Note also that the weight of the hangers supported on the hook 28 is distributed over a substantial area of the glass, including not only the window's upper edge, but also its upper side portion, the hook acting somewhat as a cantilever support for the hangers, with the hook's shank bearing inwardly against the abutting rubber flanges 16. Of course, much of the resistive countermovement occurs in the body of rubber at the base of the rib 20 in which the hook is embedded.

While the hook 28 is illustrated as formed of flat strip material, it could be formed of material of different cross-sectional shape. It will be evident, moreover, that the reversely curved shank 28' of the hook could be formed as a strip considerably wider than the hook proper, so as to distribute even more widely over the window's underlying surface the load carried by the hook.

In Figure 6 a still further modified form of the invention is shown, wherein the rubber attachment strip has entirely embedded in one of its flanges, its web and its rib, the shank portion 30 of a hook 32, so that no metal part of the hook except the hook proper is exposed. When such an attachment is used the window may be more nearly closed than it can be where the form of device shown in Figures 4 and 5 is used. As shown, the shank of the hook may extend upwardly in the body of one flange, across through part of the web, and then upwardly medially through the rib 20. With the embedded shank of the hook thus extending upwardly into the rib, the window casing itself thereby carries a portion of the supported load applied as a turning moment resulting from cantilever action of the hook as it pivots about its portion in the flange of the rubber strip as a fulcrum.

The advantages of the invention as previously set forth should now be evident, as should be the fact that the invention is not limited to the particular represented forms which merely illustrate its principal features defined in the appended claims.

I claim as my invention:

1. An automobile window clothing hanger attachment comprising spaced parallel elongated flanges adapted to engage opposite sides of the upper edge of the window, and a combined elongated web and elongated rib, said elongated web rigidly interconnecting the upper edges of said flanges, and said elongated rib projecting upwardly for reception in the upper window-receiving groove of the casing to rigidly retain said flexible attachment against dislodgement laterally from the window, said rib portion of the attachment being deeply notched to receive a clothing hanger hook without interfering with insertion of said rib upwardly into said groove by raising of the window.

2. The attachment defined in claim 1, wherein the attachment flanges, rib and web portions are formed integrally of a flexible material which will bend conformably to differently curved window casings.

MARCUS O. STEENDAHL.

REFERENCES CITED

The following references are of record in the file of this patent:

UNITED STATES PATENTS

| Number | Name | Date |
|---|---|---|
| 1,650,385 | Payton | Nov. 27, 1927 |
| 2,035,639 | Davis | Oct. 13, 1934 |
| 2,157,001 | Morley | May 2, 1939 |
| 2,344,339 | Zwald | Mar. 14, 1944 |
| 2,447,908 | Hoots | Aug. 24, 1948 |